UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

PASTE SHOE-FILLER AND PROCESS OF MAKING SAME.

1,121,054.   Specification of Letters Patent.   Patented Dec. 15, 1914.

No Drawing.   Application filed July 8, 1912.   Serial No. 708,265.

*To all whom it may concern:*

Be it known that I, ANDREW THOMA, a citizen of the United States, and resident of Cambridge, in the county of Middlesex and State of Massachusetts, have invented an Improvement in Paste Shoe-Fillers and Processes of Making Same, of which the following description is a specification.

My present invention is a paste for mixing with granulated cork or other comminuted filler-body material to make a shoe-bottom filler for cementing the same into the bottom cavity of welt shoes, and is an improvement on my previous fillers, particularly the one disclosed in my prior application Serial No. 432,083, filed May 11, 1908, which is now Patent No. 1,032,312, dated July 9, 1912 (of which this application is in part a continuation), and in the process of making it, the object thereof being to render practicable the use of binder ingredients of a pasty nature which would ordinarily become dry and harsh, to prevent the tendency thereof to make shoes squeak when placed between the soles, to render such filler more or less impervious to water, and to reinforce the same so as to render it more tough and without the usual objectionable qualities. Common flour pastes or solutions of flour paste, starch paste, potato paste, dextrin, vegetable gums, and other similar mucilaginous preparations, and silicates of soda or potash, (particularly when made in a bulky, fluffy condition, and intermixed with other body-giving component such as comminuted cork, leather dust, and the like) are advantageous for fillers, particularly for the cheaper grades of welt shoes, provided the tendency thereof to keep on drying until fragile and liable to crack and crumble when the shoe is bent and to cause squeaking thereof, can be eliminated. Particularly is this the case with the German preparation arabol. apparatin, and pastes made from starch or flour treated so as to become very bulky (swelled) and jellified in a mushy, non-flowing form, where the flour is boiled and treated with alum, or chlorid salts to a highly jellified condition, or where potato starch, for example, or corn starch or any of the well known starches are treated to a solution of alkali, chlorid of magnesium, or chlorid of calcium, etc., (for treating the starch granules and bringing them to said highly jellified, bulky condition), care being preferably taken to render the jellified mass neutral or suitable to the leather it comes in contact with as a filler.

I have discovered that by providing a permanently soft, sticky compound and bringing it and also the dry-setting compound (above alluded to) to substantially the same highly fluid condition (by chemical action or by heat) and then thoroughly beating them together, a close combination or union of the two is effected so as to form a starchy jelly-like mixture which will set to a non-shiftable condition for the shoe bottom and yet will not set to a hard, dry, or harsh and brittle condition but will remain in substantially the ideal condition required for a shoe-bottom filler.

Preferably my invention is carried out in a cold state for most of the ingredients mentioned. The non-hardening, sticky compound may be added in a heated fluid state. I have also found it advantageous to make the paste or paste-like body material separately in large receptacles and allow it to set to a jelly. An illustrative example of the manner of carrying out my invention: To say five pounds in weight of this jelly, I add one to one and a half pounds of soft wax-tailings *i. e.*, the resinous residuum of petroleum the soft, sticky varieties being preferred, which when slightly heated can be readily beaten or whipped into a close combination with the starch jelly by the use of a proper mixing machine. For commercial purposes I find that, although apparently diametrically opposed to one another, the pasty condition of both substances allows a union or emulsification and greatly facilitates the said union of the two under said heating process, which would ordinarily be impossible on account of the separation which would naturally take place with such opposed substances. The beating and mixing operation results in a fluffy, and sometimes foamy (*i. e.* cellular with confined air) composition, which can be readily admixed with ground cork, even while cold if desired, and can also readily be spread within a shoe bottom cavity in usual manner. The thick pasty condition of both components when thoroughly admixed as stated whereby the whole becomes a homogenous jelly, not only holds the wax tailings in suspension, but keeps it permanently so. By having them both in this thick pasty condition, and thoroughly whipping them together (the tailings being hot and fluid), I am enabled to incorporate the naturally repellent elements thoroughly together, and then when the mass cools, the entire tailings separate into minute globules or a finely subdivided condition, these minute particles of the wax tailings being held permanently in suspension separated from each other and prevented from sticking to one another or coalescing by the slimy enveloping paste. The slimy, mucilaginous paste and the resinous paste are beaten together to an emulsified or fluffy condition so that the resinous wax tailings has all its globules broken up or finely separated within the bulky, jellified starch which latter envelops and holds them apart. This makes a practical workable filler paste. Mixed with a coarse granular body-material the minute separation of the wax tailings within the paste is not noticeable. In order to eliminate this separation of the globules of the wax tailings altogether, I have found that the action of anilin dyes dissolved in benzol and alizarin oil and admixed with the fluffy swelled starch paste has a sufficient influence upon the wax tailings to merge them into the pasty mass and to impart the characteristic color of the tailings to the entire mixture. I have also found that with the addition of ammoniacal salts (but no anilin dyes) the wax tailings are equally influenced toward a more complete fluxing with the paste but of a lighter color.

When the filler material has dried to its ultimate normal condition in the shoe bottom, it will be found to be neither hard on account of the otherwise hard-setting nature of the starch, nor too soft on account of the otherwise low-melting soft sticky condition of the wax tailings. In other words, the union of these greatly varying ingredients controls their otherwise objectionable independent nature. I have found that this strange and unexpected union of these two widely varying components produces a binding medium of jelly-like binding substance which sets into a semi-hard, nicely yielding mass, which is no longer low-melting on the one hand nor dry and brittle on the other hand, but is tenacious, permanently flexible, and water-repellent,—a quality essential and of importance in good shoe filler material. If not applied hot in the shoe bottom cavity, the tailings in the pasty mass will soon cling in sufficient amount to the spreading knife or spatula to cause the latter to drag on the cork because there is usually such a large amount of dry cork admixed in the filler that it absorbs or withdraws from the pasty binder so much of the moisture (or sleeking element) as to leave the tailings more active or assertive for clinging to the working tool. Accordingly under such conditions I apply either to the filler or to the tool, a solution of soap or other slimy liquid for giving a temporary sleek surface. Then, when laid, the filler dries or sets, the firm-setting agent or paste asserting its stiffening influence over the low-melting sticky component to prevent the latter from responding to heat under normal conditions of use, and the other sticky component rendering the firm-setting or stiffening agent less brittle and more water-repellent, due to its sweating through the paste or permeating the enveloping jellified mass, and therefore asserting itself as a dominating water-repellent, and softening influence.

The above describes the preferred combination of materials, but large deviations therefrom are within the spirit and scope of my invention. For instance, pastes or jellies made with water from any vegetable source and of proper consistency, when admixed with a soft, low-melting compound, as above, will carry out the invention. Silicates of soda or potash in water or silicic acid can be used to replace the vegetable pastes. Jellified compositions having an animal origin, such as glue, casein, gelatin, etc., are capable of being beaten or mixed with the soft sticky compound. I have found that the ordinary pastes when brought to a fluffy, jellified condition, hold in suspension or floating the minute globules of the more sticky component in their unaltered or natural condition. Whenever the latter is to be united more closely to the paste and their identity concealed more or less, I use the emulsifying effect of the alkali on the rosin paste or naphthalate of rosin which brings about a soapy condition, or when the more sticky component is soft wax tailings, I use ammonia or its salts in the paste solution to attack the wax tailings. In this connection one of the advantages of the fluffy (beaten) feature is that it prevents precipitation. In fact, this is the intention or one object in all forms of my invention. The combining influence of the ammonia imparts to the paste somewhat of the coloring of the tailings, thereby removing the cheap unsubstantial appearance of the paste, giving the whole a better commercial appearance. Another means of imparting these results (and in an improved form) to one of my pastes is by taking, say six parts by weight of corn starch mixed in twenty-one parts by weight of water, and adding two and one-eighths parts by weight of caustic soda (twaddling 62°) in nineteen parts by weight of water and thoroughly stirring them to a fluffy state. The stock will become gelatinized and form a thick paste. When this gets smooth by stirring, I add one ounce of oil-soluble yellow anilin dye, dissolved in alizarin oil and benzol and stir thoroughly into the above paste compound. To neutralize the alkaline nature of the latter I add one-eighth of one part of carbolic acid in one part of water (to prevent souring,) and three parts of sulfuric acid (strength 24° twaddle) to two parts of water, and mix thoroughly. Then, when all are uniformly mixed, twelve ounces of sticky, soft wax tailings (in a warm fluid pasty condition) are stirred rapidly into the paste. The result is that the tailings are taken up wholly in an unrecognizable condition. The tailings overpower the dyed paste and give the whole a sort of thick mustard color.

The combination is perfect, so far as virtually concealing the tailings, but by thinning the paste with cold water the tailings can be promptly separated as such. For filler purposes, however, the union is practically perfect, and when mixed with the granular cork makes an excellent filler. The low-melting sticky compound mentioned containing the resinous residuum of petroleum or wax tailings can be replaced by other water-repellent ingredients (as will be readily understood from my previous patents and applications), such as resin naphthalates, treated resins, combinations of resins and tars, or tars alone (taking care to choose those of proper consistency and quality). In the claims, under the terms "sticky resinous component" and "resinous paste", I intend to include all these resins, such as the vegetable resins mentioned above and in the patents alluded to, and the mineral resins, which latter include the resinous residuum of petroleum, commonly known as "wax tailings". So resins subjected to the softening influence of mineral or vegetable oils or chemicals to a pasty consistency may be employed. In fact, thickened, jellified sticky bodies of vegetable oils can be used in a like manner. Soluble starches, such as the dextrins, are capable of being used, but owing to their solubility and cost (when in a thick syrupy condition), the less soluble starchy preparations mentioned are far preferable, especially when their fluffy nature mentioned is considered, which adds to their more economical and advantageous use for the purpose of a filler. The jellified bodies above mentioned, for example of starch or flour, can be treated to a softening admixture of glycerin, soluble oils, fats, saponified resins, or combinations of oils, fats, and resins, to make the paste less brittle when set.

Having described my invention, what I claim as new and desire to secure by Letters Patent is:

1. The process, which consists in heating wax tailings to a fluid condition, adding an aqueous starch paste, and then whipping until a completely emulsified fluffy mass is obtained.

2. The process which consists in adding to a sticky tacky heat-sensitive water-repellent component, a water soluble adhesive, and beating or whipping the mixture until a fluffy, permanently emulsified and permanently plastic mass is obtained.

3. The process, which consists in mixing with a permanently sticky waterproof component suitable for a shoe filler, a water dissolved, muscilaginous body, the constituents of the mixture being reduced to a condition of fluidity, and then whipping the mass until all the ingredients are thoroughly intermixed to a fluffy condition, and finally adding to this composition a comminuted filling-body material in quantity sufficient to give the final product at ordinary temperatures a stiff dough-like consistency.

4. A composition for shoe filler, consisting of a jellified pasty mass holding in suspension and in a finely disseminated and subdivided condition a sticky gummy component non-responsive to the action of water.

5. A composition for shoe filler, comprising a jellified pasty mass having a sticky resinous component beaten thereinto in an emulsified condition.

6. A composition for shoe filler, consisting of wax tailings, and an aqueous mucilaginous paste whipped together to a fluffy condition.

7. A composition for shoe filler, consisting of wax tailings, and an aqueous starchy paste whipped together to a fluffy condition.

8. A composition for shoe filler, consisting of wax tailings, and an aqueous starchy paste whipped together to a fluffy condition, thoroughly intermixed with comminuted filler-body material.

9. A composition for shoe filler, consisting of a mucilaginous paste, and a resinous paste beaten together to a fluffy mass until the resinous paste is in an emulsified condition in the mass.

10. A composition for shoe filler, consisting of a water-repellent component, a vegetable mucilaginous paste, and chemical means for fluxing the water-repellent component into a more intimate union with the aqueous mucilaginous paste beaten to a thoroughly mixed condition.

11. A composition for shoe filler, consisting of a water-repellent component, a vegetable mucilaginous paste, chemical means for fluxing the water-repellent component into a more intimate union with the aqueous mucilaginous paste beaten to a thoroughly mixed condition, and comminuted filler-body material intermixed with the foregoing mass into a stiff doughlike body.

12. A shoe filling composition, consisting of a permanently sticky water-repellent component, a water dissolved mucilaginous component having a separating and sleeking influence thereon, whipped together to a permanently emulsified condition, and a suitable filler-body material in quantity sufficient to make at ordinary temperatures a stiff doughlike mass.

13. A shoe filling composition, consisting of a permanently sticky water-repellent component, a water dissolved mucilaginous component having a separating and sleeking influence thereon, whipped together to a permanently emulsified condition, and a suitable filler-body material in quantity sufficient to make at ordinary temperatures a stiff doughlike mass and capable of setting to a permanently non-shiftable condition in a shoe bottom cavity.

14. A composition for shoe filler, comprising a vegetable paste, a jellified mineral component, and a sticky gummy component, the latter being held in finely subdivided suspension in the other two, and the whole thoroughly beaten together to a fluffy condition.

15. A composition for shoe filler, comprising a jellified mass consisting at least in part of a mineral component, and a sticky gummy component held in finely subdivided suspension throughout said mass, and the whole thoroughly beaten together to a fluffy condition.

16. A composition for shoe filler, consisting of an apparatin starch solution, an oil solution, analin dissolved in benzol and alizarin oil, mixed together, and a sticky component beaten with the foregoing into a fluffy mass until said gummy component is amalgamated therein and imparts to the mass its characteristic color.

In testimony whereof, I have signed my name to this specification, in the presence of two subscribing witnesses.

ANDREW THOMA.

Witnesses:
GEO. H. MAXWELL,
JAMES R. HODDER.